US010873987B1

(12) United States Patent
Marupaduga et al.

(10) Patent No.: US 10,873,987 B1
(45) Date of Patent: Dec. 22, 2020

(54) USE OF UPLINK NOISE AS A BASIS TO CONTROL CONFIGURATION OF DUAL-CONNECTIVITY SERVICE

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 22 days.

(21) Appl. No.: 16/431,135

(22) Filed: Jun. 4, 2019

(51) Int. Cl.
*H04W 76/15* (2018.01)
*H04W 8/08* (2009.01)
*H04W 52/14* (2009.01)
*H04W 52/24* (2009.01)

(52) U.S. Cl.
CPC ............ *H04W 76/15* (2018.02); *H04W 8/08* (2013.01); *H04W 52/146* (2013.01); *H04W 52/241* (2013.01); *H04W 52/243* (2013.01)

(58) Field of Classification Search
CPC ..... H04W 76/15; H04W 8/08; H04W 52/146; H04W 52/241
See application file for complete search history.

(56) References Cited

U.S. PATENT DOCUMENTS

| 8,285,321 | B2 | 10/2012 | Ji et al. |
| 9,445,376 | B2 | 9/2016 | Brisebois et al. |
| 9,559,816 | B2 | 1/2017 | Axmon et al. |
| 9,900,925 | B2 | 2/2018 | Fujishiro et al. |
| 10,149,170 | B2 | 12/2018 | Youn et al. |
| 2015/0065152 | A1 | 3/2015 | Sadek et al. |
| 2015/0327094 | A1* | 11/2015 | Lee ........................ H04W 24/08 370/252 |
| 2016/0219481 | A1 | 7/2016 | Wang et al. |
| 2017/0041940 | A1 | 2/2017 | Falconetti et al. |
| 2017/0055187 | A1* | 2/2017 | Kang ................. H04W 36/0069 |
| 2019/0342932 | A1* | 11/2019 | Futaki ................... H04W 76/15 |
| 2020/0077312 | A1* | 3/2020 | Tsuboi .............. H04W 36/0088 |
| 2020/0106536 | A1* | 4/2020 | Bedekar ................ H04W 48/20 |

FOREIGN PATENT DOCUMENTS

CN 103856977 6/2014

* cited by examiner

*Primary Examiner* — Maharishi V Khirodhar
*Assistant Examiner* — Kenneth P Hunt

(57) ABSTRACT

When a first node is considering setup of dual-connectivity service for a UE, the first node will take into consideration uplink noise at one or more candidate second nodes, in order to decide whether to set up the dual-connectivity service for the UE and/or to decide which of multiple second nodes to use for the UE's dual-connectivity service. For instance, if a candidate second node has threshold high uplink noise, then, based on that fact, the first node may decide to not use that second node for dual-connectivity service of the UE. Or the first node may decide to use a given candidate second node based on the given candidate second node having lower uplink noise than one or more other candidate second nodes.

20 Claims, 4 Drawing Sheets

USE OF UPLINK NOISE AS A BASIS TO CONTROL CONFIGURATION OF DUAL-CONNECTIVITY SERVICE

BACKGROUND

A cellular wireless network typically includes a number of base stations that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the base station and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to define a reference signal that UEs could measure in order to determine coverage strength, other resources could be reserved to carry downlink control-plane signaling from the base station to UEs, and other resources could be reserved to carry user-plane communications from the base station to UEs. And on the uplink, certain resources could be reserved to carry uplink control-plane signaling from UEs to the base station, and other resources could be reserved to carry user-plane communications from UEs to the base station.

OVERVIEW

In example operation, when a UE enters into coverage of such a network, the UE could initially scan for and detect threshold strong coverage of a base station on a carrier, and the UE could responsively engage signaling with the base station to establish a Radio Resource Control (RRC) connection between the UE and the base station. Further, if appropriate, the UE could then engage in attach signaling with a core-network controller to attach and thus register for service, and the core-network controller could coordinate setup for the UE of one or more user-plane bearers, each including an access-bearer portion that extends between the base station and a core-network gateway that provides connectivity with a transport network and a data-radio-bearer portion that extends over the air between the base station and the UE.

Once the UE is connected and attached, the base station could then serve the UE with packet-data communications.

For instance, when the core-network gateway receives user-plane data for transmission to the UE, the data could flow to the base station, and the base station could buffer the data, pending transmission of the data to the UE. With the example air-interface configuration noted above, the base station could then allocate downlink PRBs in an upcoming subframe for carrying at least a portion of the data, defining a transport block, to the UE. And in that subframe, the base station could transmit to the UE a scheduling directive that indicates which PRBs will carry the data, and the base station could accordingly transmit the transport block to the UE in those PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the base station a positive acknowledgement (ACK) control message, and the base station could then proceed with transmission of a next transport block (if any) to the UE. Whereas, if the UE did not receive the transmission or determined that the CRC did not match and thus that there was an error in the received transport block, then the UE could transmit to the base station a negative acknowledgement (NACK), in response to which the base station could attempt the transmission again.

Likewise, on the uplink, when the UE has user-plane data for transmission on the transport network, the UE could buffer the data, pending transmission of the data to the base station, and the UE could transmit to the base station a scheduling request that carries a buffer status report (BSR) indicating the quantity of data that the UE has buffered for transmission. With the example air-interface configuration noted above, the base station could then allocate uplink PRBs in an upcoming subframe to carry a transport block of the data from the UE and could transmit to the UE a scheduling directive indicating those upcoming PRBs, and the UE could accordingly transmit the transport block to the base station in those PRBs.

As with downlink transmission, for each transport block that the UE transmits to the base station, the base station could determine if the transport block arrived successfully, based on a CRC analysis for instance. And if the base station received the transmission successfully, then the base station could transmit to the UE an ACK and could schedule a next uplink transmission from the UE. Whereas, if the base station did not receive the transmission successfully, then the base station could transmit to the UE a NACK, and the UE could attempt retransmission to the base station.

As the industry advances from one generation of RAT to the next, issues arise with the need for UEs to support potentially multiple RATs at once. With the transition from 4G LTE to 5G NR, for instance, it is expected that networks and UEs will be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G base station concurrently with the 5G radio being served by a 5G base station. This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual-connectivity can thus be distinguished from standalone connectivity, where a UE is served on just one RAT, such as just LTE for instance.

In some dual-connectivity arrangements, one base station operating under a first RAT could serve as a master node (MN), responsible for coordinating setup and teardown of dual-connectivity service for a UE and for handling core-network control-plane signaling related to the dual-connectivity service, and another base station operating under a second RAT could serve as a secondary node (SN) to provide increased data capacity for the UE. For example, with EN-DC, a 4G base station (e.g., an evolved Node-B (eNB)) could operate as the MN, and a 5G NR base station (e.g., a next generation Node-B (gNB)) could operate as the SN.

Further, in an example of such an arrangement, one of the UE's two connections might be used for both downlink and uplink communication, while the other connection might be used for just downlink communication. In an example EN-DC implementation, for instance, where a network's 4G capacity may be more limited than its 5G capacity, a UE's 5G connection could be used for both downlink and uplink service, but the UE's 4G connection may be used for just downlink service. Other implementations are possible as well, however.

When the UE enters into coverage of such a system, the UE could initially scan for and discover threshold strong coverage of the MN under a first RAT (e.g., 4G coverage, for EN-DC), and the UE could responsively engage in signaling as discussed above to establish an RRC connection between the UE and the MN. Further, the UE could engage in attach signaling with a core-network controller via the MN, and the core-network controller could coordinate establishment for the UE of at least one bearer as discussed above.

The MN could then serve the UE in a standalone mode with packet-data communications in the manner described above. Further, the MN could trigger and/or engage in a process to establish for the UE a secondary RRC connection with an SN, so that the MN and SN can then cooperatively provide the UE with dual-connectivity service.

For instance, the MN could direct the UE to scan for secondary coverage under the second RAT and could receive in response from the UE a report that the UE detected threshold strong coverage of one or more SNs. And the MN could then coordinate setup of dual-connectivity service with the UE being served by the MN and such an SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a secondary connection between the UE and the SN. And the MN could engage in signaling with the core-network controller and/or with the SN to coordinate setup of a split bearer for the UE so that the MN could serve a portion of the UE's data communications and the SN could serve another portion of the UE's data communications.

Further, various split-bearer arrangements may be possible.

In one implementation, the split bearer could be established at the gateway, with one bearer leg extending between the gateway and the MN and another bearer leg extending between the gateway and the SN. For instance, while maintaining the UE's access-bearer between the MN and the gateway, the core-network controller could coordinate setup of a secondary access bearer between the SN and the gateway. With this arrangement, communications between the UE and the MN could flow over the access bearer between the MN and the gateway, and communications between the UE and the SN could flow over the access bearer between the SN and the gateway.

In another implementation, the split bearer could be established at the SN, with the UE's access bearer extending between the gateway and the SN and a leg of the bearer extending further between the SN and the MN. For instance, the core-network controller could coordinate transfer of the UE's access bearer from being between the gateway and the MN to instead being between the gateway and the SN, and the MN and SN could coordinate setup of the bearer leg between the MN and the SN. With this arrangement, communications between the SN and the UE would flow over the access bearer between the SN and the gateway, and communications between the MN and the UE would flow between the MN and the SN and likewise over the access bearer between the SN and the gateway.

And in yet another implementation, the split bearer could be established at the MN, with the UE's access bearer still extending between the gateway and the MN, and with a leg of the bearer extending between the MN and the SN. For instance, the MN could maintain the access bearer between the MN and the gateway, and the MN and SN could coordinate setup of the bearer leg between the MN and the SN. With this arrangement, communications between the MN and the UE could flow over the access bearer between the MN and the gateway, and communications between the SN and the UE could flow between the SN and the MN and likewise over the access bearer between the MN and the gateway.

Other split-bearer arrangements might be possible as well.

With dual-connectivity service so established through this and/or other steps, the MN and SN could then concurrently serve the UE over their respective connections with the UE, perhaps with both providing for both downlink and uplink downlink scheduled data communication, or perhaps with both providing for downlink scheduled data communication but just the SN providing for uplink scheduled data communication.

On the downlink, for instance, when the core network has data destined to the UE, the MN could coordinate downlink transmission of some of the data over the air from the MN to the UE as discussed above, and the SN could coordinate downlink transmission of other of the data over the air from the SN to the UE as discussed above. Likewise, when the UE has data to transmit, the UE could send to the MN a scheduling request for transmission of some of the data to the MN, and the MN could coordinate uplink transmission of that data over the air from the UE to the MN, and the UE could send to the SN a scheduling request for transmission of other of the data to the SN, and the SN could coordinate uplink transmission of that data over the air from the UE to the SN. Or the UE could limit its uplink transmission to just the SN.

One technical issue with any such wireless communication system is the level of uplink interference, or noise, received by a serving base station when the base station is attempting to receive and decode scheduled transmissions from its served UEs. Such uplink noise could arise from other electromagnetic radiation that exists in the same RF band and on the same RF subcarriers as the uplink UE transmissions. In particular, sources of this noise could include natural RF radiation (e.g., atmospheric interference), other served UEs transmitting to the base station on the same or similar frequencies, other wireless operators operating on the same or similar frequencies, or other nearby devices (e.g., transformers or other electronic systems) radiating on the same or similar frequencies, among other examples.

When a base station receives a high level of uplink noise on the PRBs of scheduled uplink transmissions from the base station's served UEs, the base station may have difficulty receiving and decoding those scheduled uplink transmissions. As a result, the base station may encounter increased uplink transport-block errors and consequently an increased rate of uplink retransmission, which could reduce overall uplink throughput and reduce uplink-PRB availability, among other problems.

The present disclosure provides an improvement to help address this problem in the context of dual-connectivity.

In accordance with the disclosure, when an MN is considering setup of dual-connectivity service for a UE, the MN will take into consideration the level of uplink noise at one or more potential (candidate) SNs, in order to decide whether to set up the dual-connectivity service for the UE and/or to decide which of multiple SNs to use as an SN for the UE's dual-connectivity service. For instance, if a candidate SN has threshold high level of uplink noise, then, based on that fact, the MN may decide to not use that SN for dual-connectivity service of the UE. Or if a first candidate SN has lower level of uplink noise than a second candidate SN, then, based on that fact, the MN may decide to use the first SN rather than the second SN for dual-connectivity service of the UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of EN-DC service. In particular, the example implementation will be described in the context a network that provides coverage on both 4G LTE and 5G NR, and where at least some UEs served by the network are EN-DC capable. It should be understood, however, that the principles disclosed herein could extend to apply in other scenarios as well, such as with respect to other RATs. Further, variations from the specific arrangements and processes described are possible. For instance, various described entities, connections, functions, and other elements could be added, omitted, distributed, re-located, re-ordered, combined, or changed in other ways.

Figure 1:
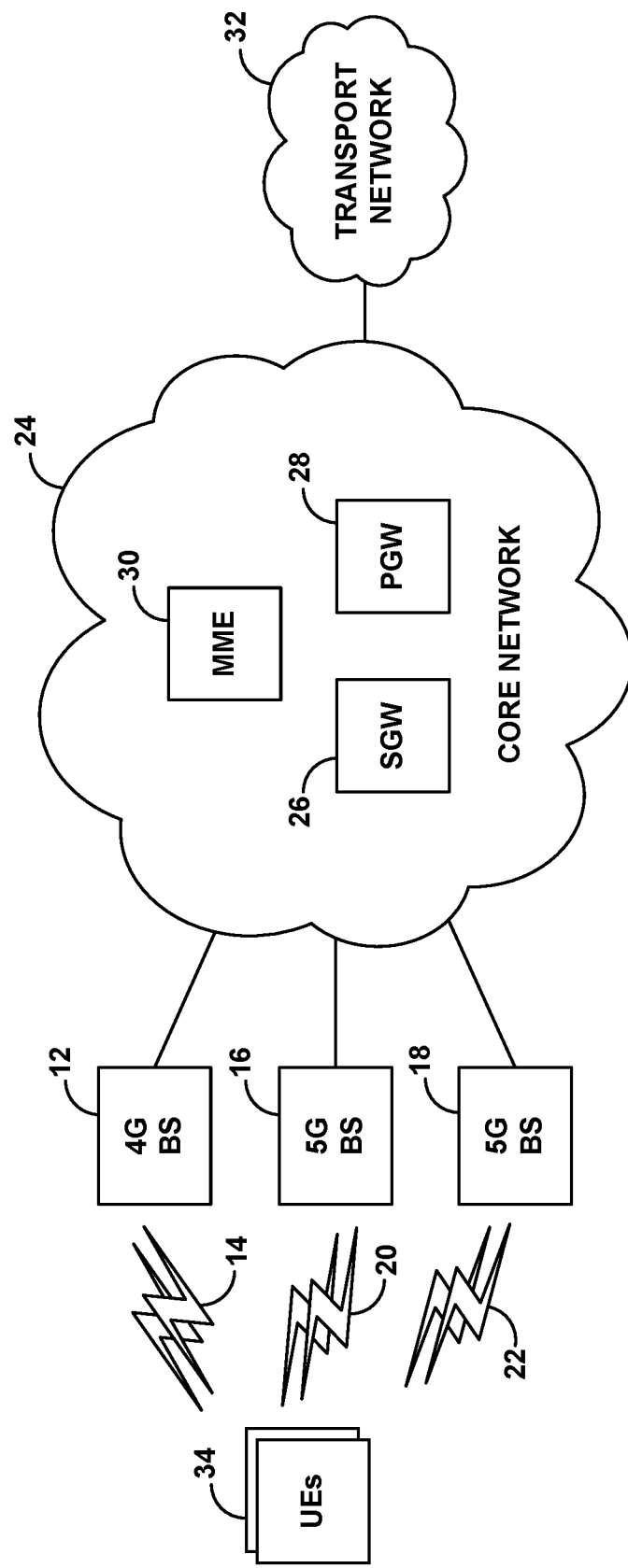
FIG. 1 is a simplified block diagram of an example network arrangement in which features of the present disclosure can be implemented.

FIG. 1 depicts an example network having a 4G base station (e.g., eNB) 12 that is configured to provide 4G service on one or more 4G carriers 14, and at least two example 5G base stations 16, 18 (e.g., gNBs), each configured to provide 5G service on one or more 5G carriers 20, 22. These base stations could be collocated with each other and could provide coverage in largely the same direction as each other, to define an area in which UEs can engage in both 4G service provided by the 4G base station 12 and 5G service provided by a 5G base station 16, 18.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in RF spectrum) and center frequency and may have a unique carrier identifier.

Further, the air interface on each carrier could be structured as described above by way of example, being divided over time into frames, subframes, timeslots, and symbol time segments, and over frequency into subcarriers, thus defining an array of air-interface resource elements grouped into PRBs allocable by the base station for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different symbol time segments than the other, and/or with one making different use of MIMO technologies than the other, among other possibilities.

As further shown, the example 4G and 5G base stations the example arrangement are each connected with a core network 24, such as an Evolved Packet Core (EPC) network or Next Generation Core (NGC) network. In the example shown, the core network includes a serving gateway (SGW)

26, a packet data network gateway (PGW) 28, and a mobility management entity (MME) 30, though other arrangements are possible as well.

In an example implementation, without limitation, each base station could have an interface with the SGW, the SGW could have an interface with the PGW, and the PGW could provide connectivity with a transport network 32. Further, each base station could have an interface with the MME, and the MME could have an interface with the SGW, so that the MME could coordinate setup of bearers for UEs to enable the UEs to engage in packet-data communication via 4G and 5G. Alternatively, just the 4G base station might have an interface with the MME and may function as an anchor for signaling with the MME both for 4G service and for 5G and EN-DC service.

FIG. 1 further depicts an example UE 34 that is be within coverage of the 4G and 5G base stations and may be served by the base stations. In a representative implementation, this example UE is 4G and 5G capable, including both a 4G radio and associated equipment and logic that enables the UE to connect with and be served by a 4G base station, and a 5G radio and associated equipment and logic that enables the UE to connect with and be served by a 5G base station. Further, in line, the example UE supports EN-DC service.

In line with the discussion above, upon entering into coverage of the base stations, UE 34 could initially scan for 4G coverage and discover threshold strong coverage of 4G base station 12 on a 4G carrier. The UE could then engage in RRC signaling with that 4G base station to establish a 4G RRC connection on the 4G carrier as discussed above. And if appropriate, the UE could engage in attach signaling with the MME through the 4G RRC connection, and the MME could coordinate setup of a bearer for the UE. Further, the 4G base station could then select a 5G base station to provide secondary connectivity for the UE, and the 4G base station could coordinate setup of EN-DC service for the UE, including setup for the UE of a 5G connection with the 5G base station on a 5G carrier, and setup of a split bearer as discussed above. The 4G base station and 5G base station could then each serve the UE with packet-data communications over their respective connection with the UE, in the manner discussed above.

In line with the discussion above, the 4G base station could take into account uplink noise at one or more candidate 5G base stations in order to decide whether to set up EN-DC service for the UE and/or in order to decide which of multiple 5G base stations to use as an SN for the UE's EN-DC service.

In a representative implementation, the 4G base station could first identify a candidate set of one or more candidate 5G base stations available for possible use in EN-DC service of the UE. The 4G base station could be pre-provisioned with data indicating this candidate set, perhaps one or more 5G base station that provide coverage collocated with coverage of the 4G base station. Or the 4G base station could direct the UE to scan for 5G coverage and could receive in response from the UE a report indicating that the UE has detected threshold strong coverage of each of one or more such 5G base stations defining the candidate set. In the arrangement of FIG. 1, the candidate set might be 5G base stations 16, 18. Or the candidate set might be just one of those 5G base stations. In another arrangement, the candidate set may include one or more other 5G base stations, perhaps more than two.

The 4G base station could then decide, based on uplink noise at each 5G base station of the candidate set, whether to set up EN-DC service for the UE. For instance, the 4G base station could determine whether uplink noise at each 5G base station of the candidate set is greater than a predefined threshold (e.g., a threshold set by engineering design as being unduly high), such as greater than −95 decibel-milliwatts (dBm) for instance. If the 4G base station thus determines that uplink noise at each 5G base station of the candidate set is greater than the predefined threshold, then, based on that determination, the 4G base station could decide to not set up EN-DC service for the UE. Whereas if the 4G base station thus determines that uplink noise at at least one 5G base station of the candidate set is not greater than the predefined threshold, then, based on that determination, the 4G base station could decide to set up EN-DC service for the UE. The 4G base station could then proceed accordingly.

Further, if there are at least two 5G base stations in the candidate set, the 4G base station could use uplink noise per 5G base station as a basis to select a 5G base station from among those in the candidate set to be an SN for the UE's EN-DC service. For instance, the 4G base station could compare the uplink noise at the candidate 5G base stations (perhaps candidate 5G base stations each deemed to have no greater than the threshold level of uplink noise), and the 4G base station could select one of the 5G base stations to be an SN for the UE's EN-DC service, with the selecting being based on a determination by the 4G base station that the uplink noise at the selected 5G base station is lower than the uplink noise respectively at each other 5G base station of the candidate set. The 4G base station could then coordinate setup of EN-DC service for the UE, including setup of a 5G connection between the UE and the selected 5G base station, and setup of a split bearer, as discussed above.

To facilitate this process, the 4G base station could have access to and refer to uplink-noise data that indicates the uplink noise respectively at each of various 5G base stations.

In practice, each such 5G base station could regularly measure its uplink noise as a measure of electromagnetic energy on the uplink channel of the 5G base station's operating carrier(s) at times when there is no uplink transmission scheduled on the carrier(s), so that the measured energy could represent an uplink noise-floor (on top of which scheduled uplink communications would occur). The 5G base station could carry out this analysis on each of one or more carriers that the 5G base station is configured to use in EN-DC service. Further, for each such carrier, the 5G base station could measure the uplink energy level across the carrier's full bandwidth or perhaps specifically on an uplink shared channel of the carrier on which scheduled uplink transmissions would occur or other portion of the carrier, among other possibilities. And the 5G base station could regularly report its respective uplink noise level to the 4G base station for storage as part of this uplink-noise data and/or could report its respective uplink noise level to another entity, such as an element management system (EMS) server, that the 4G base station could query, among other possibilities.

The uplink noise level per 5G base station could be a statistical measure of such uplink noise, such as an average over a sliding window of time. And the uplink noise could be current data (e.g., over a most recent or most-recently reported sliding window of time) or could be historical data, such as a rolled up average of such occupancy per time of day or the like, to facilitate a prediction of uplink noise at a current time of day for instance.

The 4G base station could thus refer to the uplink-noise data to determine for each 5G base station of the candidate set whether the uplink noise at the 5G base station is predefined threshold high. This could involve determining if the 5G base station's actual/current (e.g., most recently reported) uplink noise is threshold high. Alternatively or additionally, this could involve predicting, based on historical uplink-noise data, whether the 5G base station's uplink noise is now or is about to be threshold high—such as by determining that the 5G base station tends to have threshold high uplink noise at the current time of day. As noted above, based on this analysis, the 4G base station could thus decide whether to set up EN-DC service for the UE.

Further, the 4G base station could refer to the uplink-noise data to similarly determine the uplink noise at each of multiple 5G base stations in a candidate set, likewise as an actual measure or a predicted measure. And the 4G base station could select a 5G base station from the candidate based on the selected 5G base station having lower determined uplink noise than each other 5G base station of the candidate set. The 4G base station could then set up EN-DC service for the UE with respect to the selected 5G base station, including coordinating setup of a 5G connection between the UE and the selected 5G base station and coordinating setup of a split bearer for the UE.

Note that uplink noise could be one of possibly multiple factors considered by the 4G base station in deciding whether to set up EN-DC service for the UE and/or deciding which of multiple candidate 5G base stations to use as an SN for EN-DC service of the UE. The 4G base station might also take into account other, additional factors, such as reported buffer-occupancy, signal strength, transmission power, resource usage, and/or the like.

Figure 2:
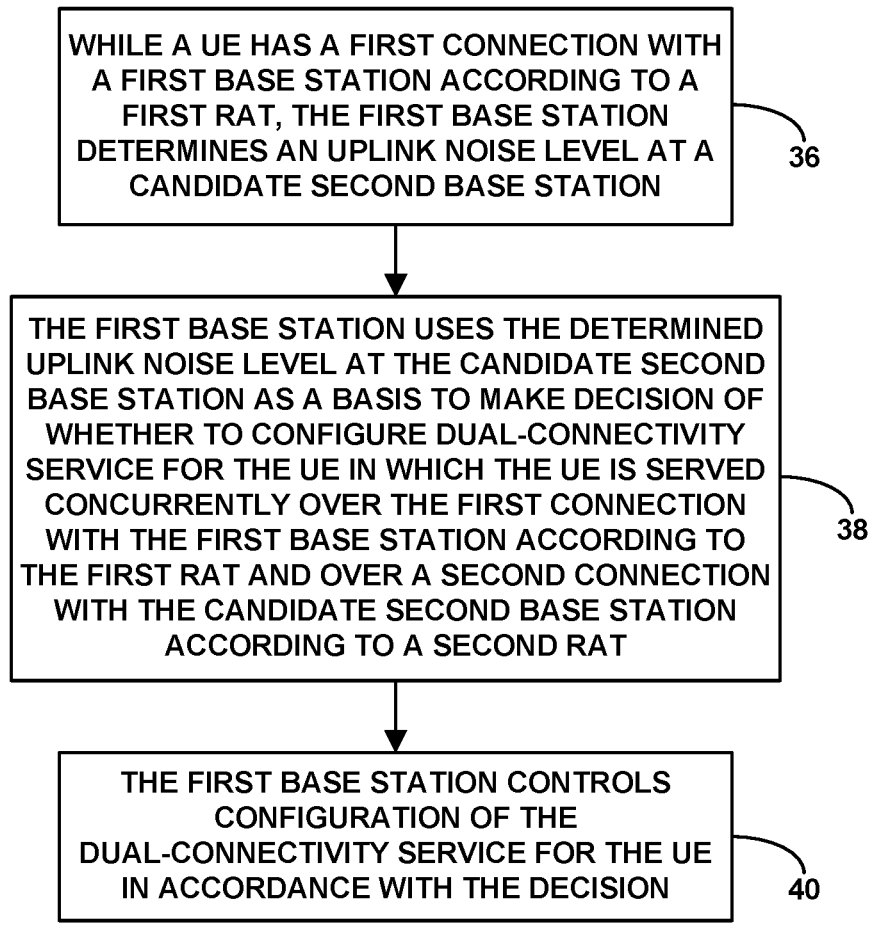
FIG. 2 is a flow chart depicting an example method in accordance with the present disclosure.

FIG. 2 is next a flow chart depicting an example method for controlling configuration of dual-connectivity service for a UE, the dual-connectivity service including the UE being served concurrently over a first connection according to a first RAT and over a second connection according to a second RAT. In an example implementation, the first RAT could be 4G LTE, the second RAT could be 5G NR, and the dual-connectivity service could be EN-DC.

Further, the method could be carried out in a wireless communication system such as that shown in FIG. 1, including a first base station configured to provide service according to the first RAT and a second base station configured to provide service according to a second RAT.

As shown in FIG. 2, at block 36, the method includes, while the UE has a first connection with a first base station according to the first RAT, the first base station determining an uplink noise level at a candidate second base station. At block 38, the method then includes the first base station using the determined uplink noise level at the candidate second base station as a basis to make a decision of whether to configure dual-connectivity service for the UE in which the UE is served concurrently over the first connection with the first base station according to the first RAT and over a second connection with the candidate second base station according to the second RAT. And at block 40, the method includes the first base station controlling configuration of the dual-connectivity service for the UE in accordance with the decision.

In line with the discussion above, the uplink noise level could be based on energy level measured by the candidate second base station on an operating carrier of the candidate second base station (e.g., at least one such carrier) in an absence of scheduled uplink data transmission to the candidate second base station. And the act of determining the uplink noise level at the candidate second base station could involve receiving from the candidate second base station a report of the uplink noise level and/or receiving an indication of the uplink noise level from a network entity to which the candidate second base station reported the uplink noise level. Further, the act of determining the uplink noise level at the candidate second base station could involve predicting the uplink noise level, based on the existence of similar uplink noise at the same or similar time of day in the past for instance.

As additionally discussed above, the act of using the determined uplink noise level at the candidate second base station as a basis to make the decision of whether to configure the dual-connectivity service with the UE having the second connection with the candidate second base station could involve (a) making a determination of whether the determined uplink noise level at the candidate second base station is at least predefined threshold high, (b) if the determination is that the determined uplink noise level at the candidate second base station is at least predefined threshold high, then, based at least on the determination, deciding to not configure the dual-connectivity service with the UE having the second connection with the candidate second base station, and (c) if the determination is that the determined uplink noise level at the candidate second base station is not at least predefined threshold high, then, based at least on the determination, deciding to configure the dual-connectivity service with the UE having the second connection with the candidate second base station.

Further, as discussed above, the act of using the determined uplink noise level at the candidate second base station as a basis to make the decision of whether to configure the dual-connectivity service with the UE having the second connection with the candidate second base station could involve (a) making a determination of whether the determined uplink noise level at the candidate second base station is greater than a determined uplink noise level at another candidate base station, (b) if the determination is that the determined uplink noise level at the candidate second base station is greater than the determined uplink noise level at the other candidate base station, then, based at least on the determination, deciding to not configure the dual-connectivity service with the UE having the second connection with the candidate second base station, and (c) if the determination is that the determined uplink noise level at the candidate second base station is not greater than the determined uplink noise level at the other candidate base station, then, based at least on the determination, deciding to configure the dual-connectivity service with the UE having the second connection with the candidate second base station.

In addition, as discussed above, if the determination is that the determined uplink noise level at the candidate second base station is greater than the determined uplink noise level at the other candidate base station, then the method could involve, based at least on the determination, configuring the dual-connectivity service with the UE having the second connection with the other candidate base station instead of with the candidate second base station.

Yet further, as discussed above, the act of controlling configuration of the dual-connectivity service for the UE in accordance with the decision could involve (a) if the decision is to configure the dual-connectivity service with the UE having the second connection with the candidate second base station, then engaging by the first base station in signaling to configure the dual-connectivity service with the UE having the second connection with the candidate second base station, and (b) if the decision is to not configure the dual-connectivity service with the UE having the second connection with the candidate second base station, then not engaging by the first base station in the signaling to configure the dual-connectivity service with the UE having the second connection with the candidate second base station. Here, configuring the dual-connectivity could include triggering, coordinating, managing, or otherwise facilitating the dual-connectivity.

Figure 3:
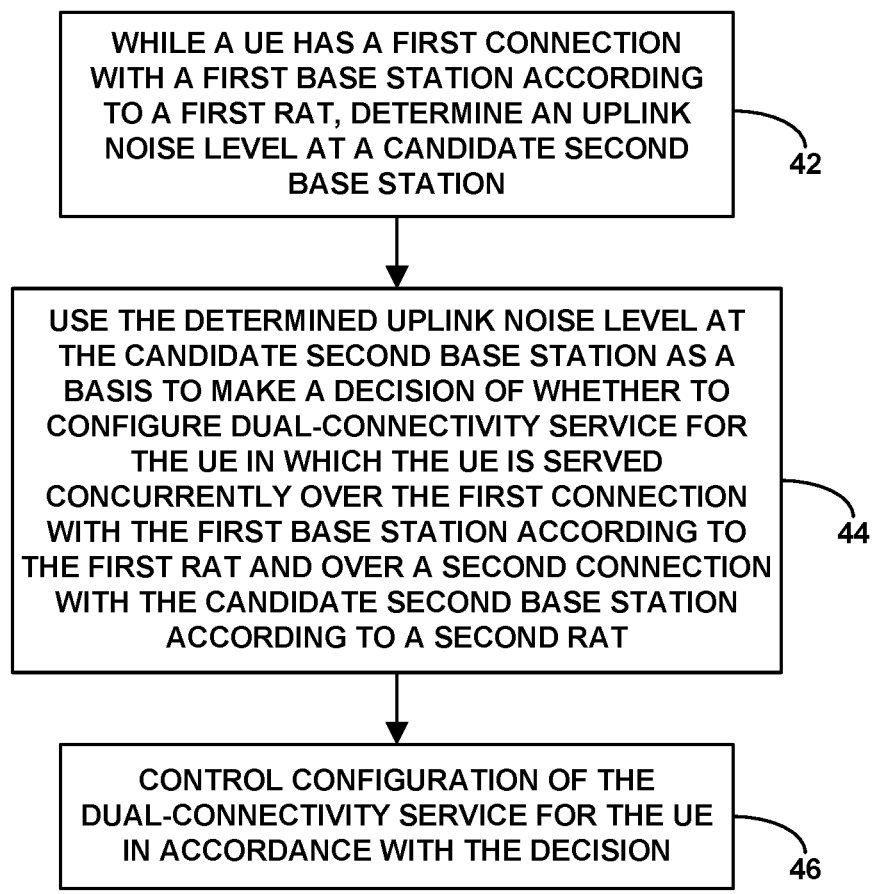
FIG. 3 is another flow chart depicting an example method in accordance with the present disclosure.

Note that while the above discussed features could be carried out by the first base station (e.g., by a 4G base station in EN-DC), the features could alternatively be carried out by one or more other entities, such as by the MME or an EMS, among other possibilities. FIG. 3 is another flow chart depicting a method like that discussed above with respect to FIG. 2, but where the operations could be carried out by the first base station and/or by one or more other entities.

As shown in FIG. 3, at block 42, the method includes, while the UE has a first connection with a first base station according to the first RAT, determining an uplink noise level at a candidate second base station. At block 44, the method then includes using the determined uplink noise level at the candidate second base station as a basis to make a decision of whether to configure dual-connectivity service for the UE in which the UE is served concurrently over the first connection with the first base station according to the first RAT and over a second connection with the candidate second base station according to the second RAT. And at block 46, the method includes controlling configuration of the dual-connectivity service for the UE in accordance with the decision.

Various features described above can be implemented in this context, and vice versa.

Figure 4:
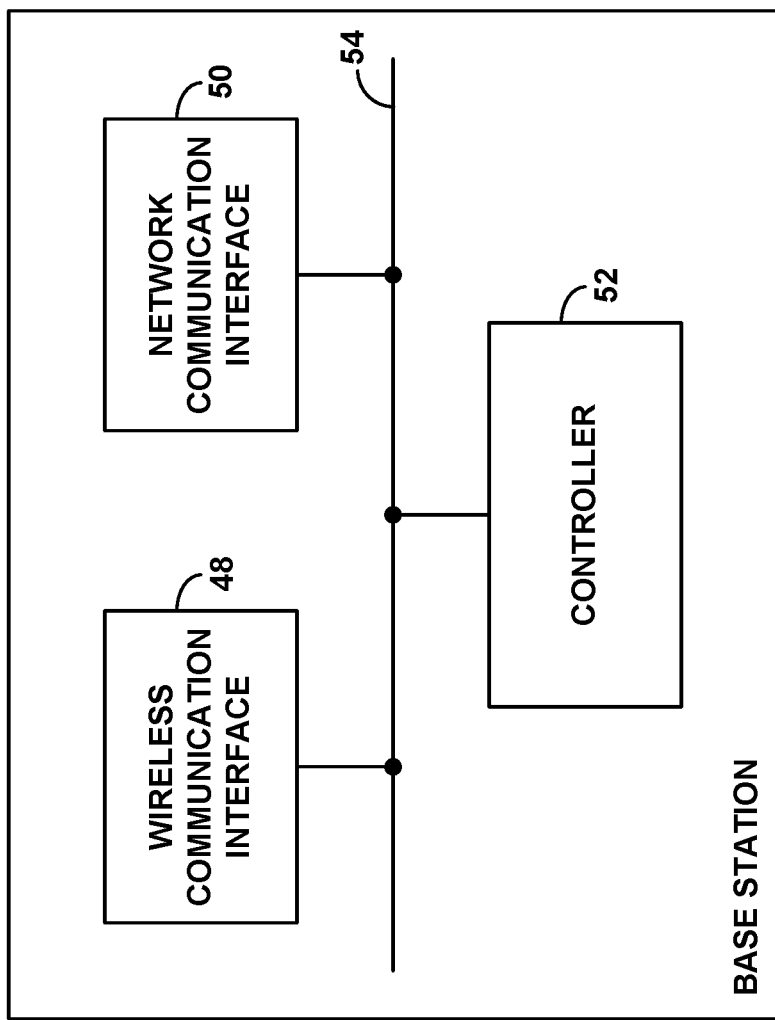
FIG. 4 is a simplified block diagram of an example base station operable in accordance with the present disclosure.

FIG. 4 is next a simplified block diagram of depicting an example base station that could operate in accordance with the present disclosure. As shown, the example base station includes a wireless communication interface 48, a network communication interface 50, and a controller 52, all of which may be communicatively linked together by a system bus, network, or other connection mechanism 54.

In the context discussed above, this base station could be configured to engage in air-interface communication and to provide service according to a first RAT through the wireless communication interface 48. Further, the base station could be provided in a wireless communication system that includes a second base station that is configured to provide service according to a second RAT. As noted above, these base stations may be collocated.

In this example base station, the wireless communication interface 48 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the first RAT. And the network communication interface 50 could comprise a wired or wireless interface, such as an Ethernet network communication interface, configured to support communication with other entities, such as with the other base station and various core-network entities.

Further, controller 52 could comprise a processing unit (e.g., one or more general purpose processors and/or specialized processors) programmed to cause the base station to carry out various operations such as those discussed above. For instance, the controller could comprise non-transitory data storage (e.g., one or more magnetic, optical, or flash storage components) holding program instructions executable by the processing unit to cause the base station to carry out such operations.

In an example implementation, these operations could include (a) determining an uplink noise level at the second base station, (b) using the determined uplink noise level at the second base station as a basis to make a decision of whether to configure for the UE dual-connectivity service in which the UE is served concurrently over the first connection with the first base station according to the first RAT and over a second connection with the second base station according the second RAT, and (c) controlling configuration of the dual-connectivity service for the UE in accordance with the decision.

Various features discussed above could be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling configuration of dual-connectivity service for a user equipment device (UE), wherein the dual-connectivity service comprises the UE being served concurrently over a first connection according to a first radio access technology (RAT) and over a second connection according to a second RAT, the method comprising:

determining, by a first base station with which the UE has the first connection according to the first RAT, an uplink noise level at a candidate second base station;

using, by the first base station, the determined uplink noise level at the candidate second base station as a basis to make a decision of whether to configure the dual-connectivity service with the UE having the second connection with the candidate second base station; and controlling, by the first base station, configuration of the dual-connectivity service for the UE in accordance with the decision.

2. The method of claim 1, wherein the uplink noise level is based on energy level measured by the candidate second base station on an operating carrier of the candidate second base station in an absence of scheduled uplink data transmission to the candidate second base station.

3. The method of claim 1, wherein determining the uplink noise level at the candidate second base station comprises receiving from the candidate second base station a report of the uplink noise level.

4. The method of claim 1, wherein determining the uplink noise level at the candidate second base station comprises receiving an indication of the uplink noise level from a network entity to which the candidate second base station reported the uplink noise level.

5. The method of claim 1, wherein determining the uplink noise level at the candidate second base station comprises predicting the uplink noise level at the candidate second base station.

6. The method of claim 1, wherein using the determined uplink noise level at the candidate second base station as a basis to make the decision of whether to configure the dual-connectivity service with the UE having the second connection with the candidate second base station comprises:

making a determination of whether the determined uplink noise level at the candidate second base station is at least predefined threshold high;

if the determination is that the determined uplink noise level at the candidate second base station is at least predefined threshold high, then, based at least on the determination, deciding to not configure the dual-connectivity service with the UE having the second connection with the candidate second base station; and if the determination is that the determined uplink noise level at the candidate second base station is not at least predefined threshold high, then, based at least on the determination, deciding to configure the dual-connectivity service with the UE having the second connection with the candidate second base station.

7. The method of claim 1, wherein using the determined uplink noise level at the candidate second base station as a basis to make the decision of whether to configure the dual-connectivity service with the UE having the second connection with the candidate second base station comprises:

making a determination of whether the determined uplink noise level at the candidate second base station is greater than a determined uplink noise level at another candidate base station;

if the determination is that the determined uplink noise level at the candidate second base station is greater than the determined uplink noise level at the other candidate base station, then, based at least on the determination, deciding to not configure the dual-connectivity service with the UE having the second connection with the candidate second base station; and if the determination is that the determined uplink noise level at the candidate second base station is not greater than the determined uplink noise level at the other candidate base station, then, based at least on the determination, deciding to configure the dual-connectivity service with the UE having the second connection with the candidate second base station.

8. The method of claim 7, further comprising:

if the determination is that the determined uplink noise level at the candidate second base station is greater than the determined uplink noise level at the other candidate base station, then, based at least on the determination, configuring the dual-connectivity service with the UE having the second connection with the other candidate base station.

9. The method of claim 1, wherein controlling configuration of the dual-connectivity service for the UE in accordance with the decision comprises:

if the decision is to configure the dual-connectivity service with the UE having the second connection with the candidate second base station, then engaging by the first base station in signaling to configure the dual-connectivity service with the UE having the second connection with the candidate second base station; and if the decision is to not configure the dual-connectivity service with the UE having the second connection with the candidate second base station, then not engaging by the first base station in the signaling to configure the dual-connectivity service with the UE having the second connection with the candidate second base station.

10. The method of claim 1, wherein the first RAT is 4G LTE, wherein the second RAT is 5G NR, and wherein the dual-connectivity service is EN-DC.

11. A method for controlling configuration of dual-connectivity service for a user equipment device (UE), wherein the dual-connectivity service comprises the UE being served concurrently over a first connection according to a first radio access technology (RAT) and over a second connection according to a second RAT, the method comprising, while the UE has the first connection with a first base station:

determining an uplink noise level at a candidate second base station;

using the determined uplink noise level at the candidate second base station as a basis to make a decision of whether to configure the dual-connectivity service with the UE having the second connection with the candidate second base station; and controlling configuration of the dual-connectivity service for the UE in accordance with the decision.

12. In a wireless communication system comprising a first base station configured to provide service according to a first radio access technology (RAT) and a second base station configured to provide service according to a second RAT, the first base station comprising:

a wireless communication interface through which to engage in air-interface communication and provide the service according to the first RAT;

a controller, wherein the controller is configured to carry out operations when a user equipment device (UE) is has a first connection with the first base station according to the first RAT, the operations including:

determining an uplink noise level at the second base station, using the determined uplink noise level at the second base station as a basis to make a decision of whether to configure for the UE dual-connectivity service in which the UE is served concurrently over the first connection with the first base station according to the first RAT and over a second connection with the second base station according the second RAT, and controlling configuration of the dual-connectivity service for the UE in accordance with the decision.

13. The system of claim 12, wherein the uplink noise level is based on energy level measured by the second base station on an operating carrier of the second base station in an absence of scheduled uplink data transmission to the second base station.

14. The system of claim 12, wherein determining the uplink noise level at the second base station comprises receiving from the second base station a report of the uplink noise level.

15. The system of claim 12, wherein determining the uplink noise level at the second base station comprises receiving an indication of the uplink noise level from a network entity to which the second base station reported the uplink noise level.

16. The system of claim 12, wherein determining the uplink noise level at the second base station comprises predicting the uplink noise level at the second base station.

17. The system of claim 12, wherein using the determined uplink noise level at the second base station as a basis to make the decision of whether to configure for the UE the dual-connectivity service in which the UE is served concurrently over the first connection with the first base station according to the first RAT and over the second connection with the second base station according the second RAT comprises:

making a determination of whether the determined uplink noise level at the second base station is at least predefined threshold high;

if the determination is that the determined uplink noise level at the second base station is at least predefined threshold high, then, based at least on the determination, deciding to not configure the dual-connectivity service for the UE in which the UE is served concurrently over the first connection with the first base station according to the first RAT and over the second connection with the second base station according the second RAT; and if the determination is that the determined uplink noise level at the second base station is not at least predefined threshold high, then, based at least on the determination, deciding to configure the dual-connectivity service for the UE in which the UE is served concurrently over the first connection with the first base station according to the first RAT and over the second connection with the second base station according the second RAT.

18. The system of claim 12, wherein using the determined uplink noise level at the second base station as a basis to make the decision of whether to configure for the UE the dual-connectivity service in which the UE is served concurrently over the first connection with the first base station according to the first RAT and over the second connection with the second base station according the second RAT comprises:

making a determination of whether the determined uplink noise level at the second base station is greater than a determined uplink noise level at another base station;

if the determination is that the determined uplink noise level at the second base station is greater than the determined uplink noise level at the other base station, then, based at least on the determination, deciding to not configure the dual-connectivity service for the UE in which the UE is served concurrently over the first connection with the first base station according to the first RAT and over the second connection with the second base station according the second RAT; and if the determination is that the determined uplink noise level at the second base station is not greater than the determined uplink noise level at the other base station, then, based at least on the determination, deciding to configure the dual-connectivity service for the UE in which the UE is served concurrently over the first connection with the first base station according to the first RAT and over the second connection with the second base station according the second RAT.

19. The system of claim 18, wherein the operations further include:

if the determination is that the determined uplink noise level at the second base station is greater than the determined uplink noise level at the other base station, then, based at least on the determination, configuring dual-connectivity service with the UE having the second connection with the other base station.

20. The system of claim 12, wherein controlling configuration of the dual-connectivity service for the UE in accordance with the decision comprises:

if the decision is to configure the dual-connectivity service with the UE having the second connection with the second base station, then engaging by the first base station in signaling to configure the dual-connectivity service for the UE; and if the decision is to not configure the dual-connectivity service with the UE having the second connection with the second base station, then not engaging by the first base station in the signaling to configure the dual-connectivity service for the UE.

* * * * *